Patented Apr. 25, 1950

2,505,349

UNITED STATES PATENT OFFICE 2,505,349

ELASTOMER-RESIN COMPOSITIONS

Lawrence E. Daly, Mishawaka, Ind., assignor to United States Rubber Company, New York, N. Y., a corporation of New Jersey No Drawing. Application November 12, 1948, Serial No. 59,780

8 Claims. (Cl. 260—45.5)

This invention relates to thermoplastic molding compositions, more particularly to tough, horny compositions made from rubbery butadiene-acrylonitrile copolymers mixed with styrene-acrylonitrile copolymer resins. Still more particularly the present invention relates to elastomer-resin compositions of the foregoing type having improved low temperature properties.

The preparation of tough, horny compositions made from rubbery butadiene-acrylonitrile copolymers mixed with hard normally inelastic styrene-acrylonitrile copolymer resins and a description of the resulting mixtures may be found in U. S. Patent No. 2,439,202 issued to the present applicant. These tough, rigid compositions have been found to be useful for many applications, but when they are made without a liquid plasticizer, they are deficient for applications which require impact resistance at low temperatures, such as at temperatures below the freezing point of water, say in the vicinity of 20° F. and lower. At such low temperatures any sharp impact caused articles molded from these compositions to crack or shatter. Even when such tough, horny compositions were prepared under very carefully controlled conditions from specially prepared ingredients, the best impact values obtainable were of the order of 3 foot pounds per inch notch Charpy at 0° F., this value being about 20% of the impact value at room temperature.

Ordinarily, the solution to the problem of poor low temperature physical properties of thermoplastic resinous compositions may be found in adding a high boiling liquid plasticizer thereto. This is only a partial solution, however, because the softening point of thermoplastic materials at elevated temperatures is reduced thereby in direct proportion to the reduction in shatter point. Thus these compositions become unsatisfactory for applications where they are required to remain rigid at temperatures above 160° F. Furthermore, liquid plasticizers are appreciably volatile and after a relatively short time the plasticizer fails to be effective.

It is the object of this invention to produce a hard, tough, thermoplastic molding composition of the type described above which retains substantially all of its exceptional room temperature impact resistance in the temperature range of 0° to —10° F. without the aid of a liquid plasticizing agent. Another object is to achieve this result without adversely affecting the properties of the elastomer-resin composition at room temperature and at elevated temperatures. Other objects of the present invention will more fully hereinafter appear.

In the manufacture of hard, tough and horny elastomer-resin compositions in accordance with my above-mentioned U. S. patent, the butadiene-acrylonitrile rubber which has been used in the past has been the ordinary Buna N type of synthetic rubber which is made with a relatively high acrylonitrile content. The acrylonitrile content of the synthetic rubber used has generally ranged from 35 to 48%, the percentage of butadiene correspondingly ranging from 65 to 52%.

The present invention is based upon the discovery that the foregoing objects may be accomplished by replacing part of the relatively high acrylonitrile rubber constituent with a relatively low acrylonitrile rubber, i. e., a rubbery copolymer of from 18 to 26% acrylonitrile and correspondingly from 82 to 74% of butadiene-1,3. This results in greatly enhanced impact resistance at temperatures of the order of 0° to —10° F.

In carrying out the present invention it is preferable to preliminarily impart to the rubbery copolymers a toluene-insoluble "B" gel content of at least 30 but less than 50%. By proceeding in this manner the appearance of the resulting elastomer-resin composition and its physical strength are greatly improved. In addition, the mixing and sheeting of the elastomer-resin composition are greatly facilitated.

The present invention resides in a hard, tough, thermoplastic homogeneous mixture of (A) a rubbery copolymer of from 35 to 48% of acrylonitrile and correspondingly from 65 to 52% of butadiene-1,3 (B) a rubbery copolymer of from 18 to 26% of acrylonitrile and correspondingly from 82 to 74% of butadiene-1,3 and (C) a hard normally inelastic resinous thermoplastic copolymer of monomers consisting essentially of from 50 to 85% of styrene and correspondingly from 50 to 15% of acrylonitrile.

The hard, tough, thermoplastic compositions of this invention contain from 50 to 90% of the styrene-acrylonitrile resin by weight based on the total weight of the resin, the high acrylonitrile rubber and the low acrylonitrile rubber. The elastomer content of my compositions, which ranges correspondingly from 50 to 10% by weight of the total weight of rubber-resin composition, is made up of a mixture of the high acrylonitrile rubber and the low acrylonitrile rubber in a ratio of from 1:3 to 3:1. In other words, the low acrylonitrile rubber may comprise from 25% to 75% of the total rubber constituent. When less than 25% of the low acrylonitrile rubber is employed the effect on low temperature impact resistance is too slight to be of importance. When it is attempted to employ more than 75% of the low acrylonitrile rubber, the compatibility of the rubbery mixture with the styrene-acrylonitrile resin is reduced and the mass lacks homogeneity.

The rubbery copolymers of butadiene and acrylonitrile employed in the practice of the present invention are well-known articles of commerce and are made in a manner well-known to those skilled in the art, usually by emulsion polymerization, for example in accordance with U. S. Patent 1,973,000. The styrene-acrylonitrile resinous copolymer used in the practice of my invention is also a well-known material, its manufacture being detailed in Patent 2,439,202 mentioned above.

In the practice of my invention I much prefer to use a styrene-acrylonitrile copolymer-resin having an intrinsic viscosity measured in dimethyl formamide of from 1 to 2 and acrylonitrile content of from 20 to 30%, the styrene content correspondingly ranging from 80 to 70%. As the intrinsic viscosity and acrylonitrile content of the resin increase above these values, the resin is harder and more brittle which results in elastomer-resin compositions, which have undesirably low impact values at low temperatures say below 20° F. Resins having an intrinsic viscosity below 1.0 say from 0.5 to 1.0, can be used but in general result in compositions having lower heat distortion values and lacking the desired rigidity.

A styrene-acrylonitrile resinous copolymer having an acrylonitrile content of from 20 to 30% and an intrinsic viscosity of from 1.0 to 2.0 can be made following the teachings of Patent No. 2,439,202. As is well known to those skilled in the art, the relative proportions of styrene and acrylonitrile in the monometric charge determine the percentage of acrylonitrile in the finished polymer. The percentage of acrylonitrile in the finished polymer is not, however, the same as in the charge. For example, a 50-50 charge will give an acrylonitrile content in the polymer of the order of 45% whereas a charge of 15% acrylonitrile and 85% styrene will give a polymer having an acrylonitrile content of the order of 12-13%. Those skilled in the art can readily select a monomeric charge giving a polymer containing 20-30% combined acrylonitrile. As to intrinsic viscosity, this is affected by the nature and the amount of the modifier used. Increasing the amount of the modifier, such as dodecyl mercaptan, will effect a decrease in the intrinsic viscosity of the polymer. Thus, one skilled in the art can readily select the modifier in amount thereof to produce a polymer having an intrinsic viscosity within the above limits. Furthermore, several styrene-acrylonitrile resinous copolymers are available commercially, and one skilled in the art can by standard methods of analysis select from these resins having the preferred acrylonitrile content and intrinsic viscosity set out above.

In the most highly preferred practice of my invention, I use a styrene-acrylonitrile resinous copolymer containing from 20 to 30% of acrylonitrile and an intrinsic viscosity of from 1 to 2, and I blend this with a mixture of butadiene-acrylonitrile rubbery copolymers having a toluene-insoluble "B" gel content of at least 30 but less than 50% and composed of substantially equal parts of a butadiene-acrylonitrile rubbery copolymer containing 35% acrylonitrile and a butadiene-acrylonitrile rubbery copolymer containing 26% acrylonitrile, the relative proportions of the resinous copolymer and the rubbery copolymers being such that the resinous copolymer is present in an amount ranging from 60 to 70% of the elastomer-resin mixture and the rubbery copolymers being present in an amount correspondingly ranging from 40 to 30%. Such a composition has extremely good impact resistance at temperatures as low as —10° F.

The preferred method of imparting the desired toluene-insoluble "B" gel content of at least 30 but less than 50% to the rubbery copolymers consists of masticating these rubbery copolymers at elevated temperatures for an extended period. Temperatures of the order of 280° to 340° F. are generally employed in this mastication, temperatures of from 300° to 320° F. being preferred. The time of mastication will depend upon the particular temperature used but will ordinarily range from 30 to 90 minutes. To build up a 30% toluene-insoluble "B" gel content typically requires from 30 to 60 minutes at 300°-320° F. while to build up a toluene-insoluble "B" gel content of about 45% will require mastication for about 90 minutes at 300°-320° F. The mastication may be carried out in a Banbury mixer or on an open rubber mill of the conventional type. The hot grinding or milling builds up what is known as "B" gel which is the portion of the treated rubber that is insoluble in toluene or benzene. "B" gel cannot be converted into a soluble gel by either hot or cold mastication. In practicing the present invention it has been found preferable to build up the insoluble "B" gel in the rubbery copolymers employed to at least 30% but less than 50% by weight. If the copolymer rubbers are mixed with the resin without first having had their gel content built up in the manner described, the resulting composition will sheet off the calender in very rough, uneven sheets.

The percentage of toluene-insoluble "B" gel in the elastomers used in the present invention may be determined by standard procedure in the art for example by extracting a 0.2 gram sample of the masticated Buna N in toluene at room temperature for at least 24 hours, drying the sample over a steam bath and determining the amount of insoluble gel. The "B" gel content is the ratio of the weight of the insoluble dried sample to the weight of the original sample.

While I may build up the toluene-insoluble "B" gel content by masticating the two rubbery butadiene-acrylonitrile copolymers separately, I generally prefer to masticate the pre-mixed rubbery copolymers. This has the advantage of simplicity, and moreover the resulting hot rubbery copolymer mixture may be directly admixed with the resinous copolymer whereas if the rubbery copolymers were separately pre-gelled, it would be necessary to use two masticating units or to reheat the rubbery copolymer which was first masticated at the time of admixture with the other pre-gelled rubbery copolymer and the resinous copolymer. Furthermore, the productivity of the equipment is considerably increased by masticating the rubbery copolymers together.

During or near the end of the mastication of the rubbery copolymers, I prefer to add and intimately incorporate with the rubbery copolymers a heat stabilizer to control the rate of gelation and keep the gelation from reaching the figure of 50% toluene-insoluble gel. The preferred heat stabilizer is a mixture of mono- and di-heptyl diphenylamines. Other heat stabilizers may be employed such as 2,5-ditertiary butyl para cresol and phenyl beta naphthylamine. While the heat stabilizing agent may be added to the rubbery copolymers before mastication is begun in which event it serves to prevent the toluene-insoluble gel content from building up too rapidly, it is often preferred to incorporate it near the end of the mastication period, say at a point sufficiently before the end of mastication to insure the attainment of an intimate homogeneous mixture. The amount of the heat stabilizer employed may vary rather widely, say between 0.5 and 10% based on the rubbery copolymers, but it is often preferred to employ from 1 to 2% thereof.

The pre-gelled rubbery copolymers and the styrene-acrylonitrile resinous copolymer may be admixed with each other in any suitable manner which results in the formation of an intimate homogeneous mixture, say in a Banbury mixer, on a rubber mill, or in any other suitable mixing apparatus. As the amount of the resinous copolymer is increased, the hardness, the toughness and the tensile strength of the resultant composition increases. The homogeneous mixture is usually calendered into a continuous thin sheet on a conventional rubber calender whereupon several plies of the thin calendered sheet material are plied up and molded into a sheet of suitable thickness by subjection to heat and pressure, for example in a hydraulic press at pressures in the range of 200 to 1000 pounds per square inch and at a platen temperature of 300–335° F. The platens of the press are then cooled to bring the temperature of the composition down to about 150° F.–180° F. whereupon it is removed from the press. Instead of molding in a platen press, the calendered sheets may be tiered and heated under mechanical pressure in a chamber with live steam and then cooled.

The resin and the rubbery copolymers are generally admixed at a temperature which is in the same range as that used in the pre-gelling of the rubbery copolymers, although this is not absolutely essential where a heat stabilizer is incorporated as described above for the reason that such a heat stabilizer operates to prevent the building up of the gel content during the admixture of the resin with the rubbery copolymers even though such admixture is effected at temperaures above 340° F.

In formulating the elastomer-resin mixtures of the present invention additional ingredients such as coloring materials, fillers, and if desired, vulcanizing ingredients for the rubbery copolymers may be incorporated therewith. It is usually preferred not to use vulcanizing ingredients because when they are omitted the scrap stock can be reused. Where it is desired to use vulcanization, the vulcanizing agent is usually sulfur in an amount sufficient to cure the elastomer content of the mix to a soft vulcanized state if it were cured alone, whether or not all of the sulfur combines with the rubber component.

Plasticizers such as dibutyl sebacate, dioctyl phthalate, etc. may also be added to the compositions of the present invention. For example 5 parts of dibutyl sebacate per 100 parts of elastomer-resin mixture will improve the low temperature impact strength of the compositions of this invention, but as indicated previously, the structural rigidity of the resulting material is adversely affected at temperatures above 160° F. For this reason I generally prefer not to use such liquid plasticizers. One of the most important features of my invention is that the use of such plasticizers with their attendant disadvantages is rendered completely unnecessary.

*Examples 1 to 10*

Forty parts of butadiene-acrylonitrile copolymer rubber was ground for about 90 minutes at 300°–320° F. in a Banbury mixer to build up the toluene-insoluble "B" gel content to about 45% and to smooth out the rubber for subsequent admixture with the resin and calendering. Five minutes before the end of the grind, 0.8 part of a mixture of mono- and di-heptyl diphenylamines was added to the rubber to prevent further building up of toluene-insoluble "B" gel therein during the subsequent processing operation. Seventy parts of styrene-acrylonitrile copolymer resin containing 27.6% by weight of acrylonitrile and an intrinsic viscosity of 1.78 was put in the Banbury together with the acrylonitrile rubber. These materials were then mixed at from 300°–320° F. After this mixing period a homogeneous elastomer-resin composition was obtained. This was discharged and then calendered into a continuous thin sheet whereupon several plies of the thin calendered sheet material were plied up and molded into a ⅛″ thick sheet in a hydraulic press with the platen temperature at 320° F.

The following Table I gives the identity of the butadiene-acrylonitrile copolymer employed together with the notched Charpy impact value at various temperatures, the tensile strength and the elongation of the resulting mixture.

*Table I*

| Example No. | 1 | 2 | 3 | 4 | 5 | 6 | 7 | 8 | 9 | 10 |
|---|---|---|---|---|---|---|---|---|---|---|
| Styrene-acrylonitrile copolymer (30% acrylonitrile) | 70 | 70 | 70 | 70 | 70 | 70 | 70 | 70 | 70 | 70 |
| Butadiene-acrylonitrile copolymer (35% acrylonitrile) | 40 | 25 | 20 | 10 | | 30 | 25 | | 30 | 30 |
| Butadiene-acrylonitrile copolymer (26% acrylonitrile) | | 15 | 20 | 30 | 40 | | | | 10 | 10 |
| Butadiene-acrylonitrile copolymer (18% acrylonitrile) | | | | | | 10 | 15 | 40 | | |
| Dibutyl Sebacate | | | | | | | | | | 5 |
| Charpy Impact Values (ft. #/in. notch) at 80° F | 14.5 | 13.2 | 14.1 | 11.3 | 12.1 | 15.8 | 14.1 | 10.2 | 13.1 | 13.0 |
| Charpy Impact Values (ft. #/in. notch) at 40° F | 16.0 | 14.9 | 15.4 | 12.9 | 10.8 | 20.0 | 14.4 | 8.6 | | 16.1 |
| Charpy Impact Values (ft. #/in. notch) at 20° F | 11.0 | 15.9 | 16.5 | 13.9 | 10.1 | 19.6 | 14.7 | 6.5 | 14.4 | 17.0 |
| Charpy Impact Values (ft. #/in. notch) at 10° F | 5.0 | 16.3 | 15.6 | 13.0 | 7.2 | 18.5 | 14.9 | 4.1 | 14.0 | 17.0 |
| Charpy Impact Values (ft. #/in. notch) at 0° F | 3.0 | 16.0 | 14.4 | 14.5 | 4.6 | 18.4 | 12.2 | 1.7 | 12.4 | 16.5 |
| Charpy Impact Values (ft. #/in. notch) at −10° F | 0.9 | 9.9 | 13.3 | 11.8 | 3.2 | 1.1 | 1.1 | 1.2 | 4.5 | 15.0 |
| Tensile Strength (#/in.²) | 2,980 | 2,380 | 2,680 | 2,920 | 3,760 | 2,400 | 2,420 | 3,250 | | |
| Elongation (per cent) | 71 | 68 | 61 | 37 | 27 | 76 | 65 | 19 | | |

From Table I it will be seen that while the use of 10 parts of the low acrylonitrile rubber with 30 parts of the high (35%) acrylonitrile rubber significantly improves the low temperature characteristics of the resulting material, use of 20 parts gives rise to a marked improvement and at 30 parts the impact values begin to go down once again. It should be noted that the composition containing 20 parts of the low acrylonitrile rubber has an impact resistance at −10° F. which is of the same order of magnitude as the impact resistance at room temperature. It will also be seen that the 26% acrylonitrile rubber gives the greater improvement in impact resistance at −10° F., although the 18% acrylonitrile rubber gives a distinct improvement in low temperature impact resistance at 0° F. Comparison of Example 10 with Example 9 indicates the improvement in low temperature impact resistance resulting from the use of a plasticizer. It will be apparent that Example 1, 5 and 8, wherein only a single acrylonitrile copolymer was employed, do not fall within the scope of the present invention but are included for comparative purposes.

*Example 11*

The following example illustrates the practice of my invention wherein the rubbery copolymers are not gelled.

Example 3 above is duplicated except that the rubbery copolymers are not masticated to build up their gel content prior to admixture with the styrene-acrylonitrile resinous copolymer. The resulting elastomer-resin mixture, when calendered and plied-up in the manner described above to give a one-eighth inch stock, has the following Charpy impact values (ft./in. notch):

| Temp. | Value |
|---|---|
| °F. | |
| 80 | 16.2 |
| 40 | 16.0 |
| 20 | 17.0 |
| 10 | 16.2 |
| 0 | 15.0 |
| Minus 10 | 14.4 |

The tensile strength is about 2560 lbs. per sq. in. and the elongation is about 70%.

In recapitulation, the following Table II indicates the upper and lower limits on each of the ingredients used in the elastomer-resin compositions of this invention.

*Table II*

| | Proportions of Monomers in Copolymer | | Proportions in Elastomer-Resin Composition |
|---|---|---|---|
| Resin | Styrene 85–50<br>Acrylonitrile 15–50 | | 50–90 |
| High Acrylonitrile Rubber | Butadiene 65–52<br>Acrylonitrile 35–48 | 75–25 | 50–10 |
| Low Acrylonitrile Rubber | Butadiene 82–74<br>Acrylonitrile 18–26 | 25–75 | |

In this specification all percentages, proportions and parts are by weight.

Having thus described my invention, what I claim and desire to protect by Letters Patent is:

1. A hard, tough, thermoplastic homogeneous mixture of (A) a rubbery copolymer of 35 to 48 per cent of acrylonitrile and correspondingly from 65 to 52 per cent of butadiene-1,3, (B) a rubbery copolymer of from 18 to 26 per cent of acrylonitrile and correspondingly from 82 to 74 per cent of butadiene-1,3, the relative proportions of (A) and (B) being such that each is present in an amount ranging from 25 to 75 per cent of the sum of (A) and (B), and (C) a hard normally inelastic resinous thermoplastic copolymer of from 50 to 85 per cent of styrene and correspondingly from 50 to 15 per cent of acrylonitrile, the relative proportions of (A), (B) and (C) being such that (C) is present in amount ranging from 50 to 90 per cent of the sum of (A), (B) and (C).

2. A hard, tough, thermoplastic homogeneous mixture of (A) a rubbery copolymer of from 35 to 48 per cent of acrylonitrile and correspondingly from 65 to 52 per cent of butadiene-1,3, (B) a rubbery copolymer of from 18 to 26 per cent of acrylonitrile and correspondingly from 82 to 74 per cent of butadiene-1,3, the relative proportions of (A) and (B) being such that each is present in an amount ranging from 25 to 75 per cent of the sum of (A) and (B), and (C) a hard normally inelastic resinous thermoplastic copolymer of from 20 to 30 per cent of acrylonitrile and correspondingly from 80 to 70 per cent of styrene and having an intrinsic viscosity of from 1 to 2, the relative proportions of (A), (B) and (C) being such that (C) is present in amount ranging from 50 to 90 per cent of the sum of (A), (B) and (C).

3. A hard, tough, thermoplastic homogeneous mixture of (A) a rubbery copolymer of 35 per cent of acrylonitrile and 65 per cent of butadiene-1,3 (B) a rubbery copolymer of 26 per cent of acrylonitrile and 74 per cent of butadiene-1,3, the relative proportions of (A) and (B) being such that each is present in an amount ranging from 25 to 75 per cent of the sum of (A) and (B), and (C) a hard normally inelastic resinous thermoplastic copolymer of from 50 to 85 per cent of styrene and correspondingly from 50 to 15 per cent of acrylonitrile, the relative proportions of (A), (B) and (C) being such that (C) is present in an amount ranging from 50 to 90 per cent of the sum of (A), (B) and (C).

4. A hard, tough, thermoplastic homogeneous mixture of (A) a rubbery copolymer of from 35 to 48 percent of acrylonitrile and correspondingly from 65 to 52 per cent of butadiene-1,3 and having a content of at least 30 but less than 50 per cent of toluene-insoluble "B" gel, (B) a rubbery copolymer of from 18 to 26 per cent of acrylonitrile and correspondingly from 82 to 74 per cent of butadiene-1,3 and having a content of at least 30 but less than 50 per cent of toluene-insoluble "B" gel, said toluene-insoluble "B" gel being incapable of conversion into a soluble gel by mastication, the relative proportions of (A) and (B) being such that each is present in an amount ranging from 25 to 75 per cent of the sum of (A) and (B), and (C) a hard normally inelastic resinous thermoplastic copolymer of from 50 to 85 per cent of styrene and correspondingly from 50 to 15 per cent of acrylonitrile, the relative proportions of (A), (B) and (C) being such that (C) is present in an amount ranging from 50 to 90 per cent of the sum of (A), (B) and (C).

5. A hard, tough, thermoplastic homogeneous mixture of (A) a rubbery copolymer of 35 per cent of acrylonitrile and 65 per cent of butadiene-1,3 and having a content of at least 30 but less than 50 per cent of toluene-insoluble "B" gel, (B) a rubbery copolymer of 26 per cent of acrylonitrile and 74 per cent of butadiene-1,3 and having a content of at least 30 but less than 50 per cent of toluene-insoluble "B" gel, said toluene-insoluble "B" gel being incapable of conversion into a soluble gel by mastication, the relative proportions of (A) and (B) being such that each is present in an amount ranging from 25 to 75 per cent of the sum of (A) and (B), and (C) a hard normally inelastic resinous thermoplastic copolymer of from 50 to 85 per cent of styrene and correspondingly from 50 to 15 per cent of acrylonitrile, the relative proportions of (A), (B) and (C) being such that (C) is present in an amount ranging from 50 to 90 per cent of the sum of (A), (B) and (C).

6. A hard, tough, thermoplastic homogeneous mixture of (A) a rubbery copolymer of 35 per cent of acrylonitrile and 65 per cent of butadiene-1,3 and having a content of at least 30 but less than 50 per cent of toluene-insoluble "B" gel, (B) a rubbery copolymer of 26 per cent of acrylonitrile and 74 per cent of butadiene-1,3 and having a content of at least 30 but less than 50 per cent of toluene-insoluble "B" gel, said toluene-insoluble "B" gel being incapable of conversion into a soluble gel by mastication, and (C) a hard normally inelastic resinous thermoplastic copolymer of from 20 to 30 per cent of acrylonitrile and correspondingly from 80 to 70 per cent of styrene and an intrinsic viscosity of from 1 to 2, the relative proportions of (A), (B) and (C) being such that (A) and (B) are present in equal proportions and (C) is present in an amount ranging from 50 to 90 per cent of the sum of (A), (B) and (C).

7. A hard, tough, thermoplastic homogeneous mixture of (A) a rubbery copolymer of 35 per cent of acrylonitrile and 65 per cent of butadiene-1,3 and having a content of at least 30 but less than 50 per cent of toluene-insoluble "B" gel, (B) a rubbery copolymer of 26 per cent of acrylonitrile and 74 per cent of butadiene-1,3 and having a content of at least 30 but less than 50 per cent of toluene-insoluble "B" gel, said toluene-insoluble "B" gel being incapable of conversion into a soluble gel by mastication, and (C) a hard normally inelastic resinous thermoplastic copolymer of 70 per cent of styrene and 30 per cent of acrylonitrile, the relative proportions of (A), (B) and (C) being in the ratio of 20:20:70.

8. The process of making a hard, tough, thermoplastic elastomer-resin mixture which comprises masticating at a temperature of from 280° to 340° F. (A) a rubbery copolymer from 35 to 48 per cent of acrylonitrile and correspondingly from 65 to 52 per cent of butadiene-1,3 and (B) a rubbery copolymer of from 18 to 26 per cent of acrylonitrile and correspondingly from 82 to 74 per cent of butadiene-1,3 until said rubbery copolymers (A) and (B) have a toluene-insoluble "B" gel content of at least 30 but less than 50 per cent, said toluene-insoluble "B" gel being incapable of conversion into a soluble gel by mastication, and then intimately and homogeneously incorporating the resulting rubbery copolymers with (C) a hard normally inelastic resinous thermoplastic copolymer of from 50 to 85 per cent of styrene and correspondingly from 50 to 15 per cent of acrylonitrile, the relative proportions being such that each of (A) and (B) is present in an amount ranging from 25 to 75 per cent of the sum of (A) and (B) and that (C) is present in an amount ranging from 50 to 90 per cent of the sum of (A), (B) and (C).

LAWRENCE E. DALY.

REFERENCES CITED

The following references are of record in the file of this patent:

UNITED STATES PATENTS

| Number | Name | Date |
| --- | --- | --- |
| 2,439,202 | Daly | Apr. 6, 1948 |

OTHER REFERENCES

White et al., pages 770–775, Aug. 1945, Ind. & Eng. Chem.